United States Patent
Annavajjala et al.

(10) Patent No.: US 8,509,330 B2
(45) Date of Patent: Aug. 13, 2013

(54) METHOD FOR ESTIMATING TIME-VARYING AND FREQUENCY-SELECTIVE CHANNELS

(75) Inventors: Ramesh Annavajjala, Quincy, MA (US); Hobin Kim, San Diego, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 234 days.

(21) Appl. No.: 12/894,994

(22) Filed: Sep. 30, 2010

(65) Prior Publication Data
US 2012/0082252 A1    Apr. 5, 2012

(51) Int. Cl.
*H04K 1/10*     (2006.01)
(52) U.S. Cl.
USPC ........... 375/260; 370/329; 370/464; 370/536; 370/542; 455/103
(58) Field of Classification Search
None
See application file for complete search history.

(56) References Cited

U.S. PATENT DOCUMENTS

| 6,587,526 B1 * | 7/2003 | Li et al. ................. 375/355 |
| 2002/0024994 A1 * | 2/2002 | Piirainen et al. ............. 375/231 |
| 2004/0264585 A1 * | 12/2004 | Borran et al. ............. 375/260 |
| 2005/0147025 A1 * | 7/2005 | Auer ........................ 370/203 |
| 2011/0261905 A1 * | 10/2011 | Shental et al. ............... 375/316 |

* cited by examiner

*Primary Examiner* — Adolf Dsouza
(74) *Attorney, Agent, or Firm* — Dirk Brinkman; Gene Vinokur

(57) ABSTRACT

Time-varying and frequency-selective channels in an orthogonal frequency division multiplexing (OFDM) network are estimated by first storing, in a buffer at a receiver, a received signal corresponding to a set of pilot tones of a set of OFDM symbols. The pilot tones are predetermined and inserted in frequency subcarriers and time slots of the OFDM symbol. A covariance matrix of the received signal is estimated. A diagonal matrix is estimated based on the covariance matrix and a variance of noise in the received signal. The diagonal matrix indicates delays of non-zero paths in a time domain. A channel impulse response (CIR) for each OFDM symbol is estimated using the diagonal matrix, and the received signal. Then, the CIR is transformed to the frequency domain to obtain the channel frequency response (CFR).

9 Claims, 3 Drawing Sheets

120

200

300

METHOD FOR ESTIMATING TIME-VARYING AND FREQUENCY-SELECTIVE CHANNELS

FIELD OF THE INVENTION

This invention relates generally to communication networks, and more particularly, to orthogonal frequency division multiplexing (OFDM) and estimating channel state information (CSI), that is the channel impulse response (CIR) estimation.

BACKGROUND OF THE INVENTION

In a communication network, instantaneous channel state information (CSI) is required at the receiver for coherent detection. In practice, to achieve this, the transmitter sends a pilot signal including pilot tones, which are predetermined and known at the receiver. Then, the receiver estimates the CSI based on the received signal.

In OFDM, Pilot Symbol Assisted Modulation (PSAM) can be used to estimate the CSI, where the pilot tones are inserted over sub-carriers. Partial or entire sub-carriers can be assigned to the pilot tones. More pilot tones improve the accuracy of the CSI. However, the pilot tones consume bandwidth and decrease the effective data rate.

Due to the multipath, wireless channel have a random fluctuation in the frequency domain, which makes the channel frequency selective. In addition, mobility can result in the Doppler effect, so the channel becomes time-varying. With the combinations of the multipath and time-variations, the wireless channel becomes doubly selective with fluctuations in both time and frequency domains.

One way to estimate a doubly selective channel is to insert the pilot tones in the time and the frequency domains. Then, one can construct a two-dimensional filter as the CSI estimator that processes the pilot tones in time and frequency. However, this requires a high computational complexity and an additional processing delay.

The number of pilot tones that are inserted can be related to the channel selectivity in the time and frequency domains. If the channel has a high selectivity in frequency domain, more pilot tone can be assigned in the frequency domain. In a same way, for a time-varying channel, more the pilot tones can be assigned in the time domain.

In practice, a block-type pilot tone assignment, where all sub-carriers of specific OFDM symbol are allocated to the pilot tones, is useful for a slow-fading and frequency-selective channel. In contrast, comb-type pilot assignment, where the specific sub-carriers (frequencies) are assigned to the pilot tones, is appropriate for the fast fading channel.

Channel estimation can be performed in the frequency domain as well as in the time domain. In the frequency domain, a channel frequency response (CFR) is estimated. In the time domain, a channel impulse response (CIR) is estimated, where the channel frequency response is found by a discrete Fourier transform of the CIR.

SUMMARY OF THE INVENTION

The invention provides a method for estimating a channel in a wireless communication network using pilot tones. A transmitter transmits pilot tones that are periodically inserted in frequency subcarriers and time slots.

Described is a method for determining a number of pilot tones and their allocation in frequency and time domains at the transmitter. Also described is the channel estimation process at a receiver.

Specifically, time-varying and frequency-selective channels in an orthogonal frequency division multiplexing (OFDM) network are estimated by first storing, in a buffer at a receiver, a received signal corresponding to a set of pilot tones of a set of OFDM symbols, wherein the pilot tones are predetermined and inserted in frequency subcarriers and time slots of the OFDM symbol. A covariance matrix of the received signal is estimated. A diagonal matrix is estimated based on the covariance matrix and a variance of noise in the received signal. The diagonal matrix indicates delays of non-zero paths in a time domain. A channel impulse response (CIR) for each OFDM symbol is estimated using the diagonal matrix, and the received signal. Then, the CIR is transformed to the frequency domain to obtain the channel frequency response (CFR).

DETAILED DESCRIPTION OF THE PREFERRED EMBODIMENTS

Figure 1:
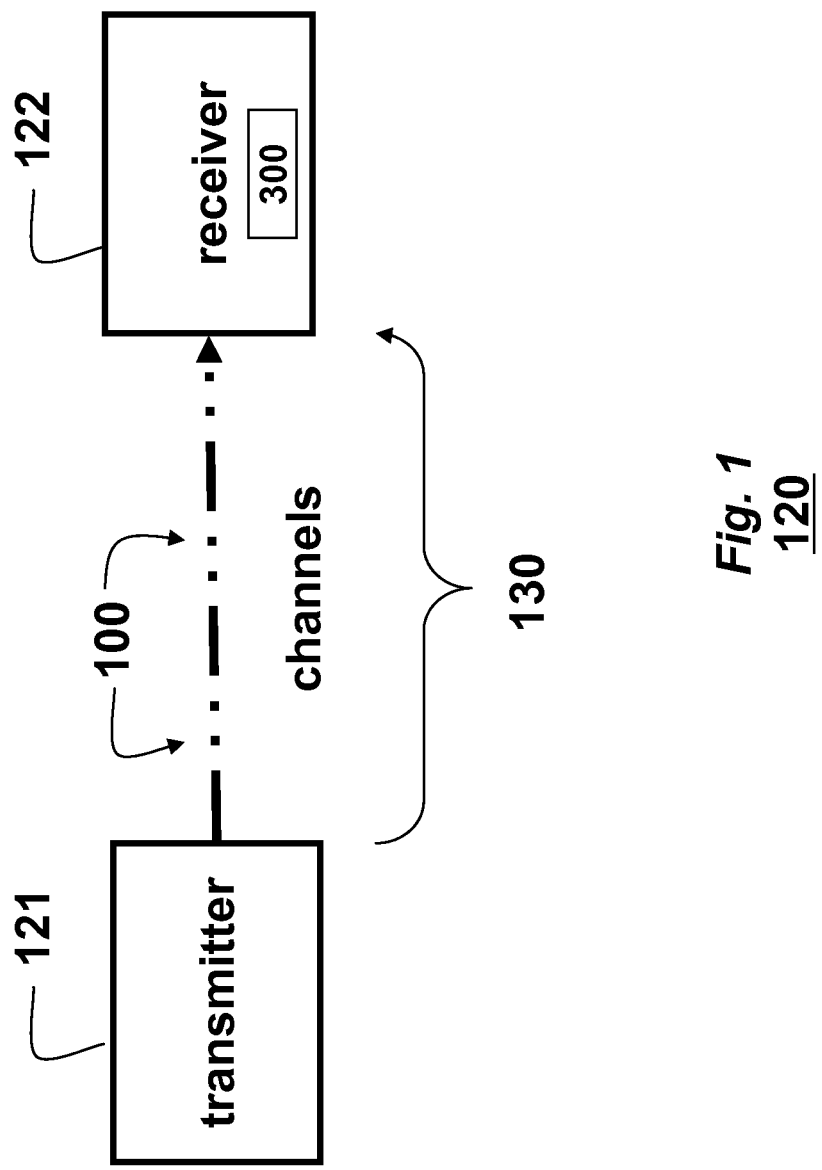
FIG. 1 is a schematic of a wireless network according to embodiments of the invention.

As shown in FIG. 1, the embodiments of our invention provide a method 300 for estimating channels 130 in a receiver 122 of an orthogonal frequency division multiplexing (OFDM) wireless communication network 120 using pilot tones 100. A transmitter 121 periodically transmits the pilot tones.

Random Pilot Tone Assignment

Figure 2:
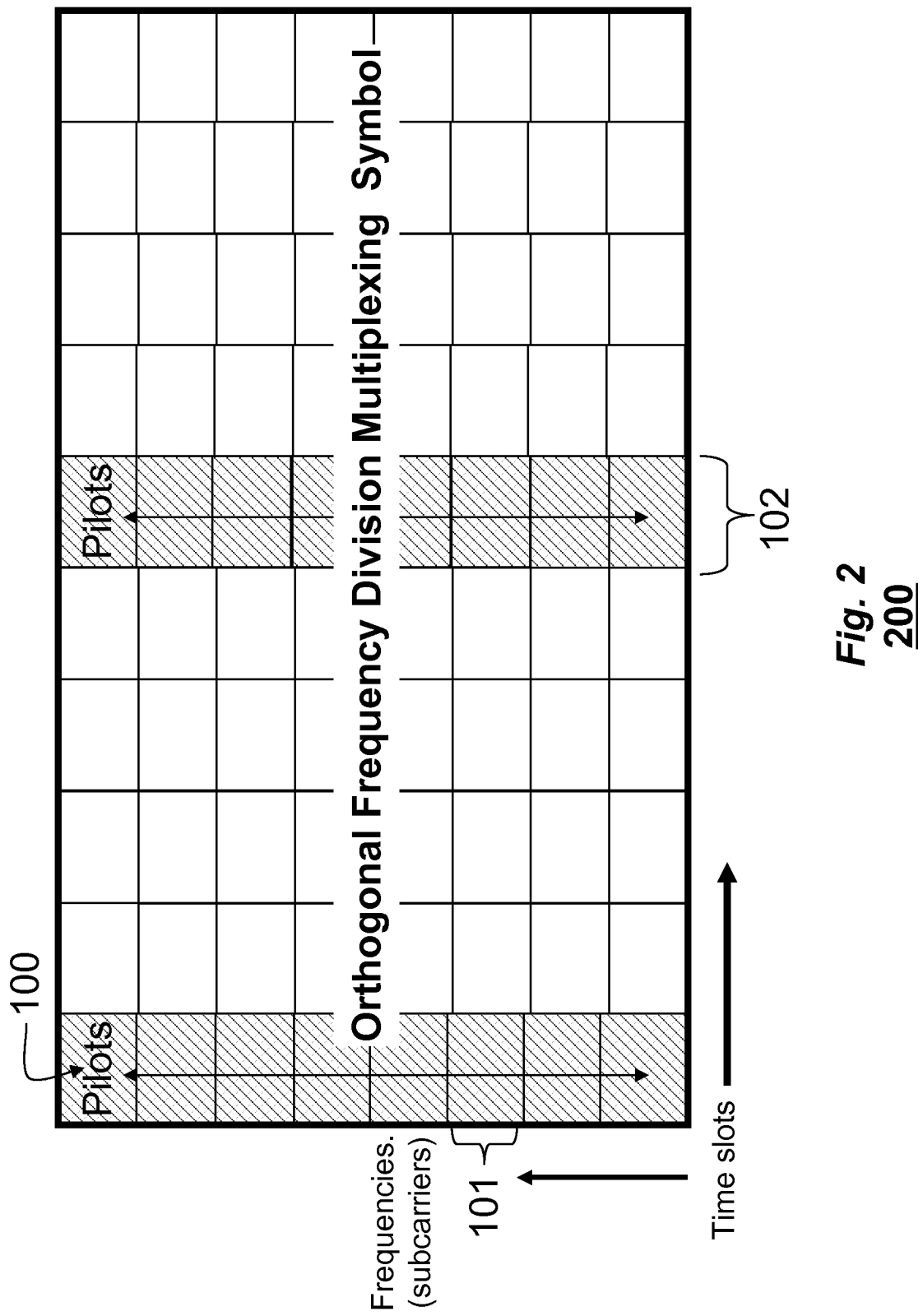
FIG. 2 is a block diagram of an orthogonal frequency division multiplexing (OFDM) symbol according to embodiments of the invention.

A shown in FIG. 2, a set of pilot tones 100 are inserted in frequency subcarriers 101 and time slots 102 of a orthogonal frequency division multiplexing (OFDM) symbol 200. The example symbol uses a set of ten time slots and eight frequencies in each OFDM symbol.

The number of pilot subcarriers in the set of pilot tones of a single OFDM symbol can depend on the number of non-zero (significant) delay paths in the channel 120. Based on the number of frequencies, the transmitter allocates the set of pilot tones uniformly and at random to the assigned frequencies. The number of pilot tones and their frequencies are predetermined and known at the receiver.

A number of occurrences of pilot tones in the time domain can depend on a Doppler spread, mobility of the receiver, or an environment in which the receiver operates. For example, in an indoor environment, the pilot tones can be transmitted less frequently than in outdoor or mobile environments.

Channel Estimation at the Receiver

Each channel 130 between the transmitter and the receiver is modeled as an impulse response as $$h(t) = \sum_{l=0}^{N-1} \alpha_l \delta(t - \tau_l T_s),$$

where $\alpha_l$ is a complex gain, $\tau_l$ is a delay corresponding to the $l^{th}$ path, and $T_S$ is a sampling interval. In addition, there are non-zero (significant) delay paths.

If we denote $\bar{h}$ as the vector of a channel impulse response (CIR), then a channel frequency response (CFR) can be represented as H=Fh, where F is a discrete Fourier transform (DFT) matrix, and H is the vector of the CFR.

When a predetermined pilot tones are transmitted, then the received signal can be represented as H[n, k]X[n, k]+W[n, k], where H[n, k], X[n, k] and W[n, k] are the CFR, transmitted pilot signal and additive Gaussian noise for nth subcarrier at $k^{th}$ OFDM symbol, respectively.

Using the above CFR, the received signal is $\underline{Y}[k]=F_p\underline{h}[k]+\underline{W}[k]$, where $F_p$ is the submatrix of the DFT matrix including rows corresponding to the pilot subcarriers, and $\underline{W}[k]$ is the vector of independent and identically distributed (i.i.d.) Gaussian noise, and $\underline{h}[k]$ is the CIR at $k^{th}$ OFDM symbol.

When a number of the pilot tones is insufficient, then $\underline{h}[k]$ can be estimated using a compressed sensing process, such as basis pursuit (BP), matching pursuit (MP), or orthogonal matching pursuit (OMP). Compressed sensing, as known in the art, acquires and reconstructs a sparse or compressible signal utilizing prior knowledge, e.g., a structure and a redundancy of the signal.

The estimation of $\underline{h}[k]$ is performed jointly over multiple OFDM symbols, where a power delay profile (PDP) of the channel is assumed to be fixed even when the instantaneous channel gain is time-varying. That is, $\underline{h}[k]$ is separated into two components, such as $$\underline{h}[k]=Q\underline{r}[k],$$

where a diagonal matrix Q represents whether each path has zero or non-zero coefficient, and $\underline{r}[k]$ is the vector of the actual coefficient gain at the $k^{th}$ OFDM symbol. With the above assumption, the matrix Q and the statistics of $\underline{r}[k]$ are fixed for multiple OFDM symbols.

At the $k^{th}$ OFDM symbol, the received signal vector is represented as $$\underline{Y}[k]=F_pQ\underline{r}[k]+\underline{W}[k].$$

The covariance matrix of the received signal is determined as $$E[\underline{Y}[k]\underline{Y}[k]^H] = E[(F_pQ\underline{r}[k]+\underline{W}[k])(F_pQ\underline{r}[k]+\underline{W}[k])^H]$$
$$= F_pQE[\underline{r}[k]\underline{r}^H[k]]QF_p^H + E[\underline{W}[k]\underline{W}^H[k]]$$
$$= F_pQE[\underline{r}[k]\underline{r}^H[k]]QF_p^H + \sigma_w^2 I,$$

where $\sigma_w^2$ is the variance of noise in the received signal.

Then, we have $$E[\underline{Y}[k]\underline{Y}[k]^H]-\sigma_w^2 I = F_pQE[\underline{r}[k]\underline{r}^H[k]]QF_p^H.$$

In practice, $E[YY^H]$ can be determined from multiple OFDM symbols as $$\frac{1}{K}\sum_{k=1}^{K}\underline{Y}[k]\underline{Y}^H[k].$$

$E[\underline{r}[k]\underline{r}^H[k]]$, which represents the PDP that is not be available at the receiver. In that case, it can be assumed that the PDP is a constant or exponentially decaying function.

As we defined above, diagonal elements in the matrix Q represent whether the delay path has zero or non-zero coefficient. Therefore, the detection of the non-(significant delay paths is equivalent to the detection of non-zero diagonal elements in the matrix Q.

Various compressed sensing processes, BP, MP or OMP can be used to detect the diagonal elements in the matrix Q.

After the detection of the non-zero delay paths, the coefficients corresponding to the delay paths at $k^{th}$ OFDM symbol can be estimated from the following equation:

$$\underline{Y}[k]=\hat{F}_p\hat{\underline{h}}[k]+\underline{W}[k],$$

where $\hat{F}_p$ is the submatrix of the DFT matrix, which only has the columns corresponding to the non-zero delay paths, and $\hat{\underline{h}}[k]$ only has the non-zero delay paths. The estimated CIR $\hat{\underline{h}}[k]$ can be found using a least square (LS) estimation.

Figure 3:
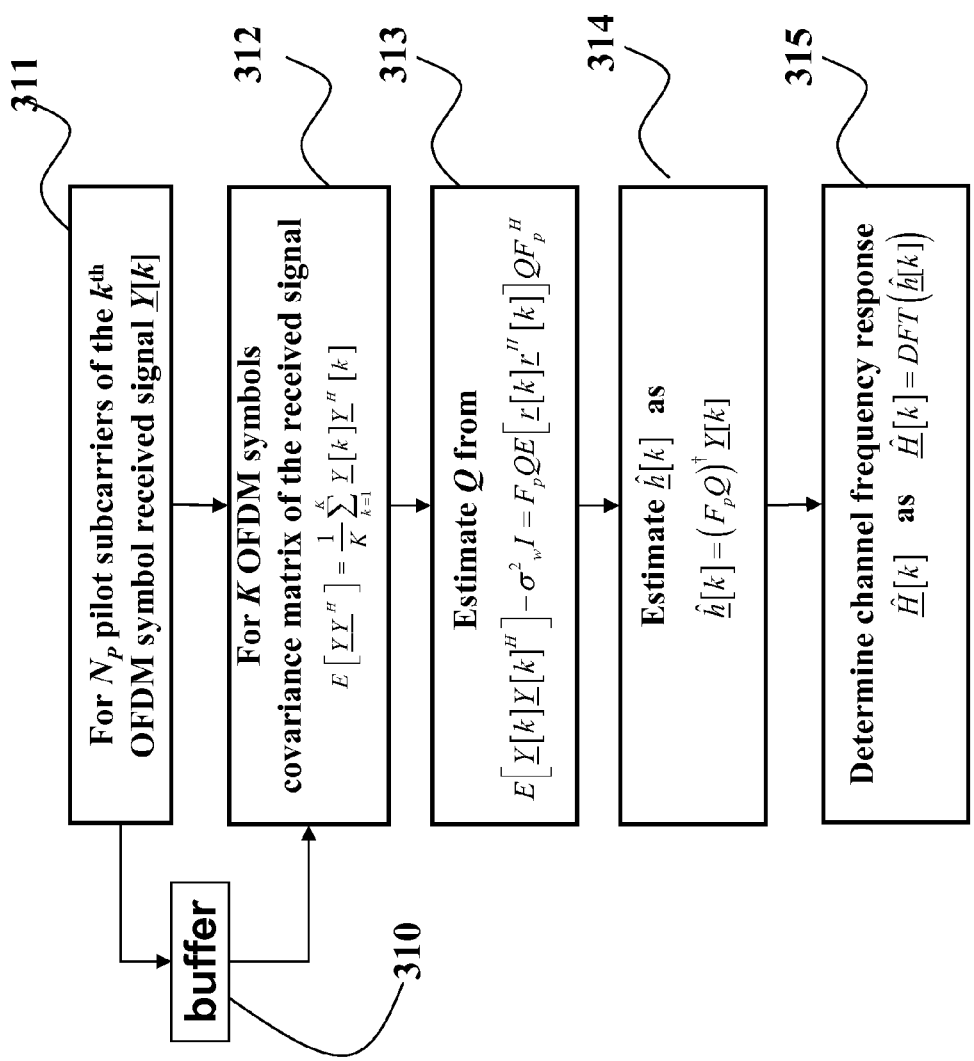
FIG. 3 is a flow diagram of a method for estimating a channel according to embodiments of the invention.

FIG. 3 shows the method 300 for estimating the channel according to embodiments of our invention.

The received signal, corresponding to the set of $N_p$ pilot tones, is stored 311 in a buffer 310.

After receiving a set of K OFDM symbols, where K is pre-determined based on the channel environment, the covariance matrix of the received signal is determined 312. The frequency subcarriers, time slots and number of OFDM symbols are predetermined and known at the receiver.

The diagonal matrix Q is estimated 313 based on the covariance matrix and a variance of noise. The matrix Q indicates delays of the non-zero (significant) paths in the time domain. The matrix Q is estimated using a compressed sensing process, such as BP, MP or OMP.

The CIR for a $k^{th}$ OFDM symbol is estimated 314 using the matrix Q and the received signal Y[k].

Then, the CIR is transformed 315 to the frequency domain to obtain the CFR.

EFFECT OF THE INVENTION

Compared to conventional channel estimation, the invention has the following advantages:
  a. the invention can reduce the required number of pilot subcarriers in doubly selective channel by exploiting the correlation between symbols in their structures of delay paths;
  b. the invention does not depend on the frequency selectivity in frequency domain. Therefore, fewer pilot tones are required, even in a highly frequency selective channel;
  c. the invention does not require a priori knowledge of the channel statistics such as the channel covariance matrix; and
  d. the invention can reduce the computational complexity by detecting the non-zero path delays for multiple symbols.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:
1. A method for estimating time-varying and frequency-selective channels in an orthogonal frequency division multiplexing (OFDM) network, comprising:
    storing, in a buffer at a receiver, a received signal corresponding to a set of pilot tones of a set of OFDM symbols, wherein the pilot tones are predetermined and inserted in frequency subcarriers and time slots of the OFDM symbol;
    estimating a covariance matrix of the received signal;
    estimating, using a compressed sensing, a diagonal matrix Q based on the covariance matrix and a variance of noise in the received signal, wherein the diagonal matrix indicates delays of non-zero paths in a time domain;

estimating jointly over multiple OFDM symbols a channel impulse response (CIR) h[k] for each OFDM symbol k using the diagonal matrix, and the received, signal according to $$\underline{h}[k] = Q\underline{r}[k],$$

wherein r[k] is a vector of an actual coefficient gain at the OFDM symbol, k; and transforming the CIR to the frequency domain to obtain a channel frequency response (CFR).

2. The method of claim 1, wherein the set of pilot tones are inserted uniformly and at random in a transmitted signal at a transmitter.

3. The method of claim 1, wherein a number of pilot subcarriers in the set of pilot tones of a single OFDM symbol depends on a number of delay paths in the channels, wherein the delay paths are non-zero and significant.

4. The method of claim 3, wherein the number of pilot subcarriers depends on a Doppler spread in the channels.

5. The method of claim 3, wherein the number of pilot subcarriers depends on a mobility of the receiver.

6. The method of claim 3, wherein the number of pilot subcarriers depends on an environment in which the receiver operates.

7. The method of claim 1, wherein the CIR is estimated using a compressed sensing process.

8. The method of claim 1, wherein the estimating of the CIR is performed jointly over the set of OFDM symbols.

9. The method of claim 1, wherein a power delay profile of the channels is fixed even when an instantaneous channel gain is time-varying.

\* \* \* \* \*